United States Patent
Tene et al.

(10) Patent No.: US 7,669,202 B1
(45) Date of Patent: Feb. 23, 2010

(54) RESOURCE MANAGEMENT

(75) Inventors: Gil Tene, San Carlos, CA (US); Shyam Pillalamarri, Los Altos Hills, CA (US)

(73) Assignee: Azul Systems, Inc., Mountain View, CA (US)

( * ) Notice: Subject to any disclaimer, the term of this patent is extended or adjusted under 35 U.S.C. 154(b) by 1073 days.

(21) Appl. No.: 10/959,409

(22) Filed: Oct. 5, 2004

(51) Int. Cl.
*G06F 9/455* (2006.01)
(52) U.S. Cl. .......................... 718/1; 718/104
(58) Field of Classification Search .......... 718/1, 718/104
See application file for complete search history.

(56) References Cited

U.S. PATENT DOCUMENTS

| | | | |
|---|---|---|---|
| 7,290,178 B2 * | 10/2007 | Rothman et al. | 714/39 |
| 2005/0132362 A1 * | 6/2005 | Knauerhase et al. | 718/1 |
| 2005/0132367 A1 * | 6/2005 | Tewari et al. | 718/1 |
| 2005/0138620 A1 * | 6/2005 | Lewites | 718/1 |
| 2005/0198632 A1 * | 9/2005 | Lantz et al. | 718/1 |
| 2005/0198633 A1 * | 9/2005 | Lantz et al. | 718/1 |

* cited by examiner

*Primary Examiner*—Andy Ho
(74) *Attorney, Agent, or Firm*—Van Pelt, Yi & James LLP

(57) ABSTRACT

A technique for executing a segmented virtual machine (VM) is disclosed. A plurality of core VM's are implemented in a common core space. Each core VM is associated with a shell VM. Resources of the core space are allocated among the core VM's. A core VM is associated with a shell VM configured to perform shell VM functions and communicate with the core VM. VM internal execution functionality is performed on the core VM. The shell VM may be bypassed to communicate with an external application.

51 Claims, 17 Drawing Sheets

RESOURCE MANAGEMENT

CROSS REFERENCE TO OTHER APPLICATIONS

Co-pending U.S. patent application Ser. No. 10/823,414 entitled INFORMATION REDIRECTION filed Apr. 12, 2004 is incorporated herein by reference for all purposes; and U.S. patent application Ser. No. 10/701,388 entitled MEMORY MANAGEMENT filed Aug. 4, 2003 now U.S. Pat. No. 7,117,318 is incorporated herein by reference for all purposes.

FIELD OF THE INVENTION

The present invention relates generally to virtual machines (VM's). More specifically, a segmented virtual machine is disclosed.

BACKGROUND OF THE INVENTION

An increasing number of software applications are written to platform independent execution environments such as the Java Runtime Environment and the .NET Common Language Runtime. These applications generally execute within a virtual machine (VM) that provides a level of abstraction between the program execution environment and the external software interface. Applications often use middleware frameworks on top of these execution environments. Examples of such frameworks are J2EE application servers and the .NET framework.

A general purpose device, such as a computer, commonly has finite resources. If each VM's execution resources is provided by the general purpose device, any such device can only support a limited number of applications and VM's. Data centers often need to support a significant number of applications. As a result, a large number of general purpose devices are deployed for resource planning purposes, with each application allotted enough resources for its peak needs, making such a setup costly to deploy and administer.

FIG. 1 is a block diagram illustrating an example system configuration for running web applications using J2EE application server frameworks. A user request is intercepted by a web server 100 and is directed to an appropriate general purpose device 102. Software components including VM 114, application server 116, and application 118 are stored on a data storage device 112 that is accessible from general purpose device 102. At initialization time, the stored software components are loaded into general purpose device 102. The runtime instantiations of the software components include VM 104, application server 106 and application 108. VM 104 launches application server 106, which in turn launches application 108. The application handles the user requests, processes the business logic associated with the requests, and communicates with database 110 if appropriate, and passes the result back to the web server.

In order to support a large number of applications, a large number of general purpose devices are deployed to accommodate the peak resource needs of the applications. It would be desirable to have a way to provide large scale application support at reduced deployment and administration costs. Also, given the existing investment in middleware frameworks and applications, an effective solution to the problem should be backward compatible with the existing applications and frameworks.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A system and method for an improved virtual machine (VM) are disclosed. In one embodiment, the VM segments its functionality into a shell VM and a core VM that are separate. The shell VM performs interactions with the external environment. The core VM performs VM internal execution functions including managing memory, performing computations, transferring data, processing data and processing logic. The core VM communicates through the shell VM for interaction with the external environment. Resources consumed by the core VM are separate, both logically and physically, from those consumed by the shell VM. The external environment does not need to be aware of the VM segmentation and can interact solely with the shell VM. To the external environment, the distribution of VM internal execution functions and shell functions appears transparent. The shell VM appears as a complete VM, even though it does not consume resources needed for VM internal execution.

Figure 2A:
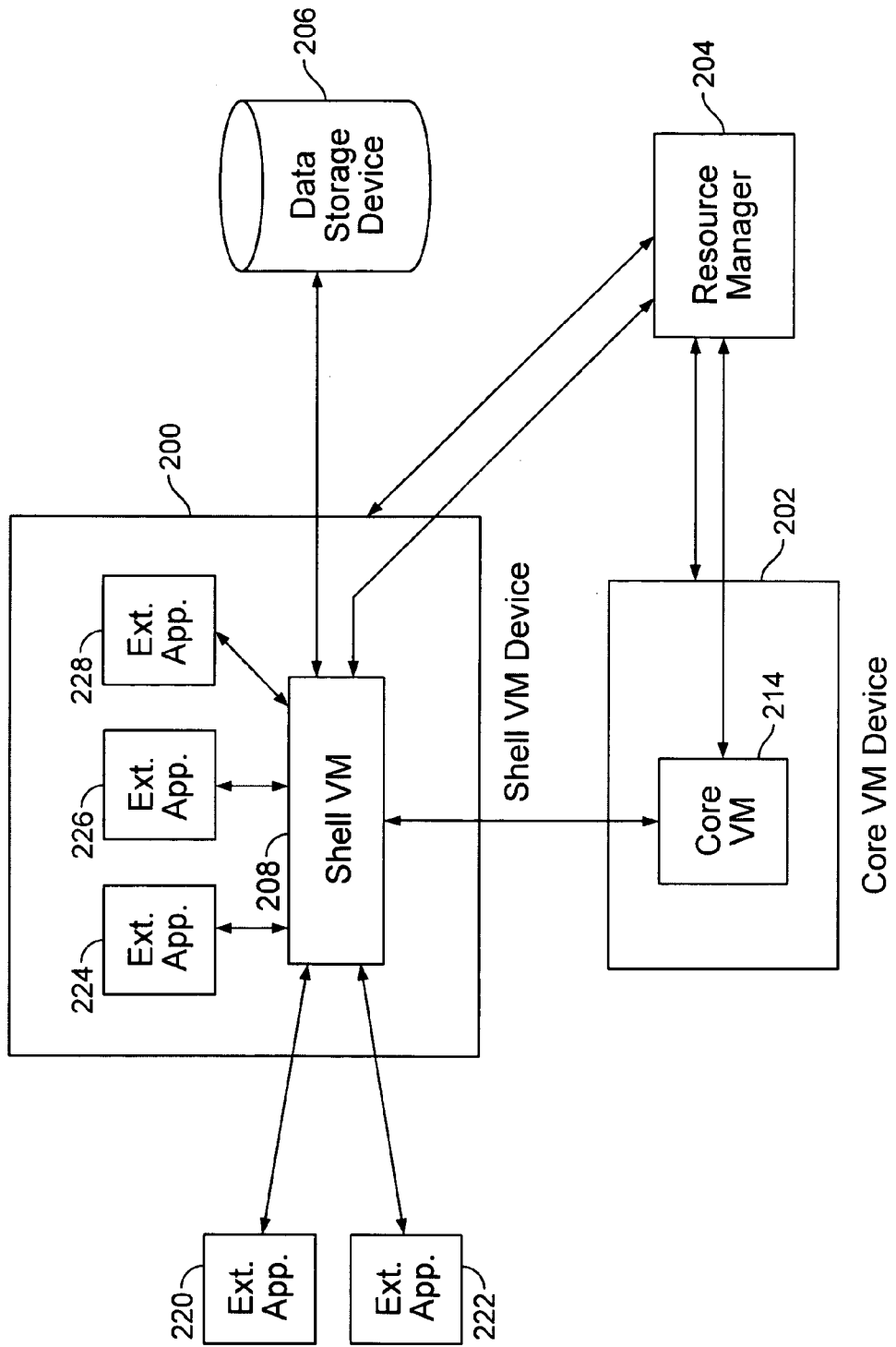
FIG. 2A is a block diagram illustrating a system embodiment according to the present invention.

FIG. 2A is a block diagram illustrating a system embodiment according to the present invention. The system includes a shell VM device 200, a core VM device 202, a resource manager 204 and a data storage device 206. The shell and core VM devices can be implemented using a wide range of hardware that is capable of executing software. Such devices include full computer systems, processors, application specific integrated circuits (ASIC's), or any other appropriate device. Shell VM 208 resides on the shell VM device and core VM 214 resides on the core VM device. Applications 220, 222, 224, 226 and 228 are referred to as external applications because their execution environment is independent of the VM. These external applications communicate with the shell VM to perform various functions. They may be located external to the Shell VM device (220 and 222), or on the Shell VM device (224, 226 and 228). These external applications interact with shell VM 208 directly, which may relay some of the interactions to core VM 214.

The shell VM may utilize one or more communications interfaces on the shell VM device to communicate with the external applications as well as with the core VM on a core VM device. In some embodiments, the shell VM also communicates with the data storage device, and optionally with the resource manager. The interfaces are separate in some embodiments and shared in others. The shell VM may also communicate with applications that reside on the shell VM device. The core VM may utilize one or more communication interfaces on the core VM device to communicate with the shell VM on a shell VM device. In some embodiments, the core VM also communicates with the data storage device, and optionally the resource manager.

Both the shell and core VM devices may communicate with the data storage device to load necessary software components. A resource manager 204 may communicate with the shell VM, the core VM, the shell VM device and the core VM device, allocating and managing system resources. The resource manager is an optional part of the system and may be omitted in some embodiments.

Figure 2B:
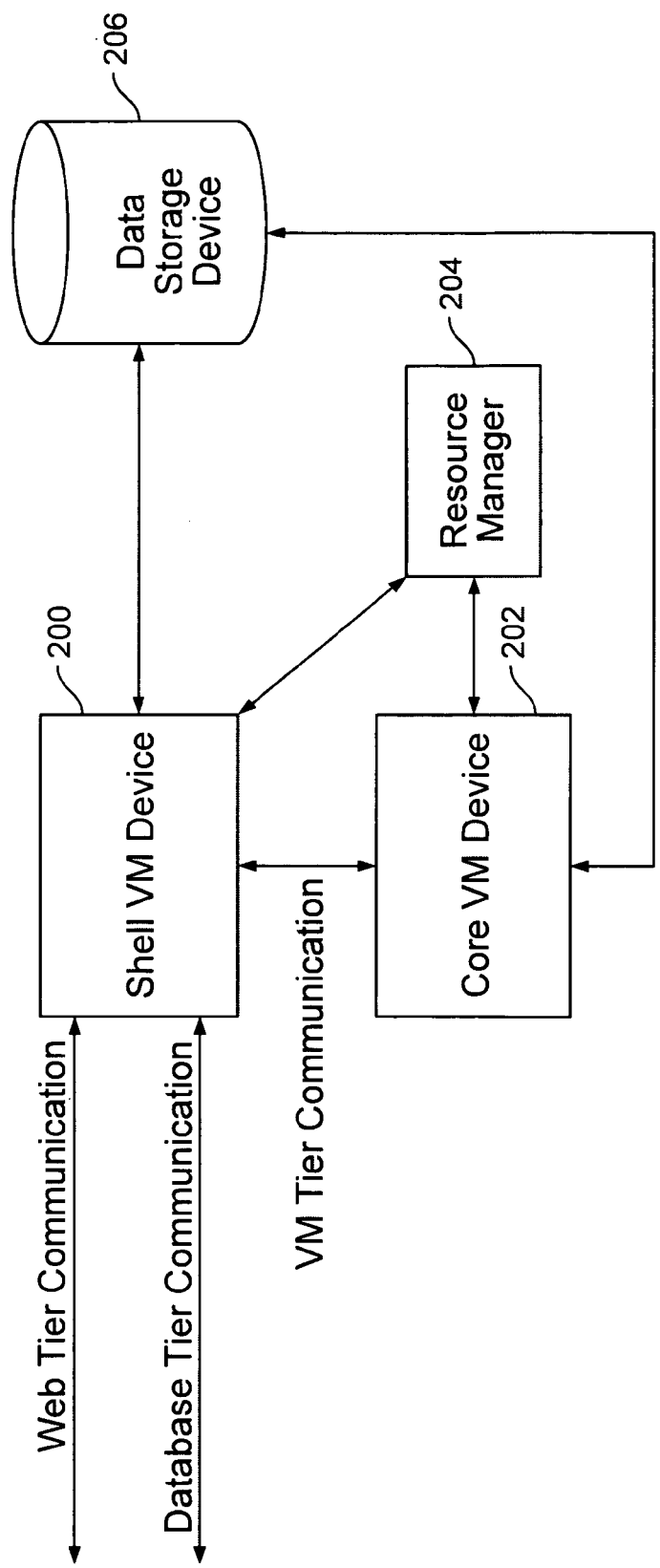
FIG. 2B is a block diagram illustrating an example system according to the present invention within a typical application server deployment.

FIG. 2B is a block diagram illustrating an example system according to the present invention within a typical application server deployment. The system includes a shell VM device 200 that includes a shell VM, a core VM device 202 that includes the core VM, a resource manager 204 and a data storage device 206. In this example, the shell VM communicates with a web tier application and a database tier application that are both external to the shell VM device. It also communicates with core VM on the core VM device, a data storage device and a resource manager.

Figure 2C:
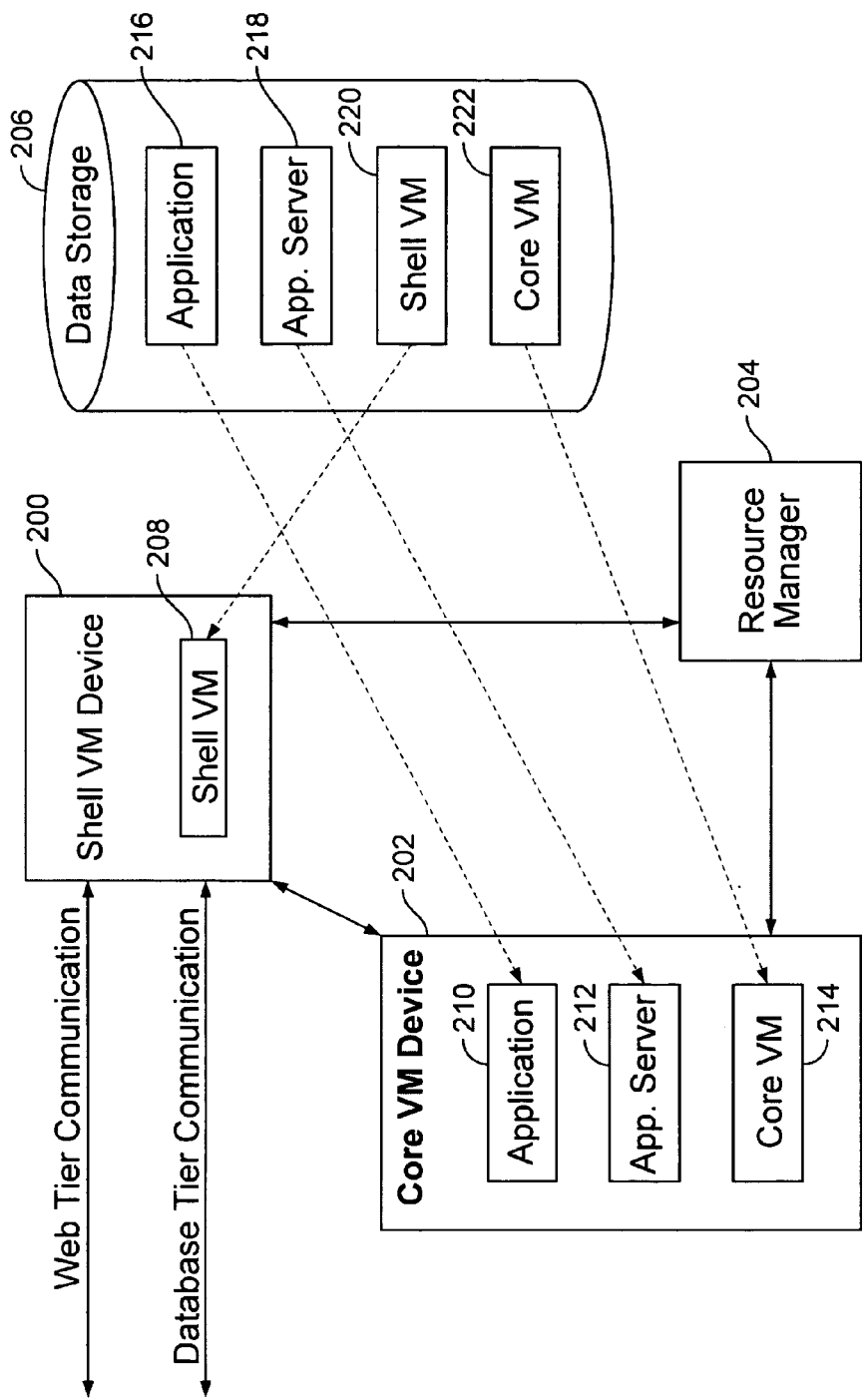
FIG. 2C is a more detailed block diagram of the example system shown in FIG. 2B.

FIG. 2C is a more detailed block diagram of the example system shown in FIG. 2B. Data storage device 206 stores various software components including application 216, application server 218, shell VM 220 and core VM 222. In other embodiments, the numbers of instances for each type of software component may vary. During initialization, instead of loading software components onto the same device, the shell VM is loaded onto shell VM device 200, whereas the application, the application server and the core VM are loaded onto core VM device 202. The dashed lines indicate the loading of software components from the data storage device to the VM devices.

The shell and core VM segment the functionality of a conventional VM. The shell VM performs interactions with the external environment. For a user, a web server or a database that comes from the external environment, the interaction with the shell VM device is transparent; that is, the interaction appears to be substantially the same as the interaction with the general purpose device shown in FIG. 1. The shell VM appears to receive and respond to requests in substantially the same way as the conventional VM shown in FIG. 1. An existing system similar to the one shown in FIG. 1 can be transparently switched to using a new configuration similar to FIGS. 2A and 2B without modifying the code for the application server and the application.

The external environment—such as a web server or a user—interacts with the system by sending requests to the shell VM device. There are many ways to conduct the interaction, including through system calls, networking calls, file input/output (I/O) calls, etc. For embodiments that employ Java VM, the interaction also includes using Java Native Interface (JNI) calls.

Calls into the VM are intercepted by shell VM 208 and forwarded to core VM 214 on core VM device 202. The calls are forwarded to the core VM using a predefined communication scheme. In one embodiment, the forwarding is performed via remote procedure calls (RPC's). The calls are received and processed by core VM 214, and then further processed by application server 212 and application 210. The processed result is sent to the shell VM, and eventually passed back to the caller. The core VM supports VM internal execution functionality such as maintaining memory and performing data processing in a way similar to a conventional VM.

Calls originating from the VM or the application executing within it are intercepted by core VM 214 and forwarded to shell VM 208 on shell VM device 200. The calls are forwarded to the shell VM using a predefined communication scheme. In one embodiment, the forwarding is performed via RPC's. The calls are received and processed by shell VM 208 which translates them into the proper interactions with the external environment. The processed result is sent to the core VM, and eventually passed back to the caller. The shell VM supports interactions with the external environment such as system calls, file I/O, networking in a way similar to a conventional VM.

Segmenting functionality between a shell VM and a core VM improves the system's scalability, manageability, flexibility and efficiency. Since a shell VM is relatively lightweight and consumes fewer resources than a conventional VM, many instances of the shell VM can run on the same shell VM device. Similarly, many instances of core VM's, application servers and applications can run on the same core VM device. Since the shell VM's and the core VM's communicate via a network, there does not need to be a strict physical correspondence between the devices. A core VM device can concurrently host multiple core VM's and support multiple applications invoked by shell VM's from heterogeneous shell VM devices having different operating systems. Similarly, a shell VM device can concurrently support multiple shell VM's invoking applications on heterogeneous core VM devices.

Figure 1:
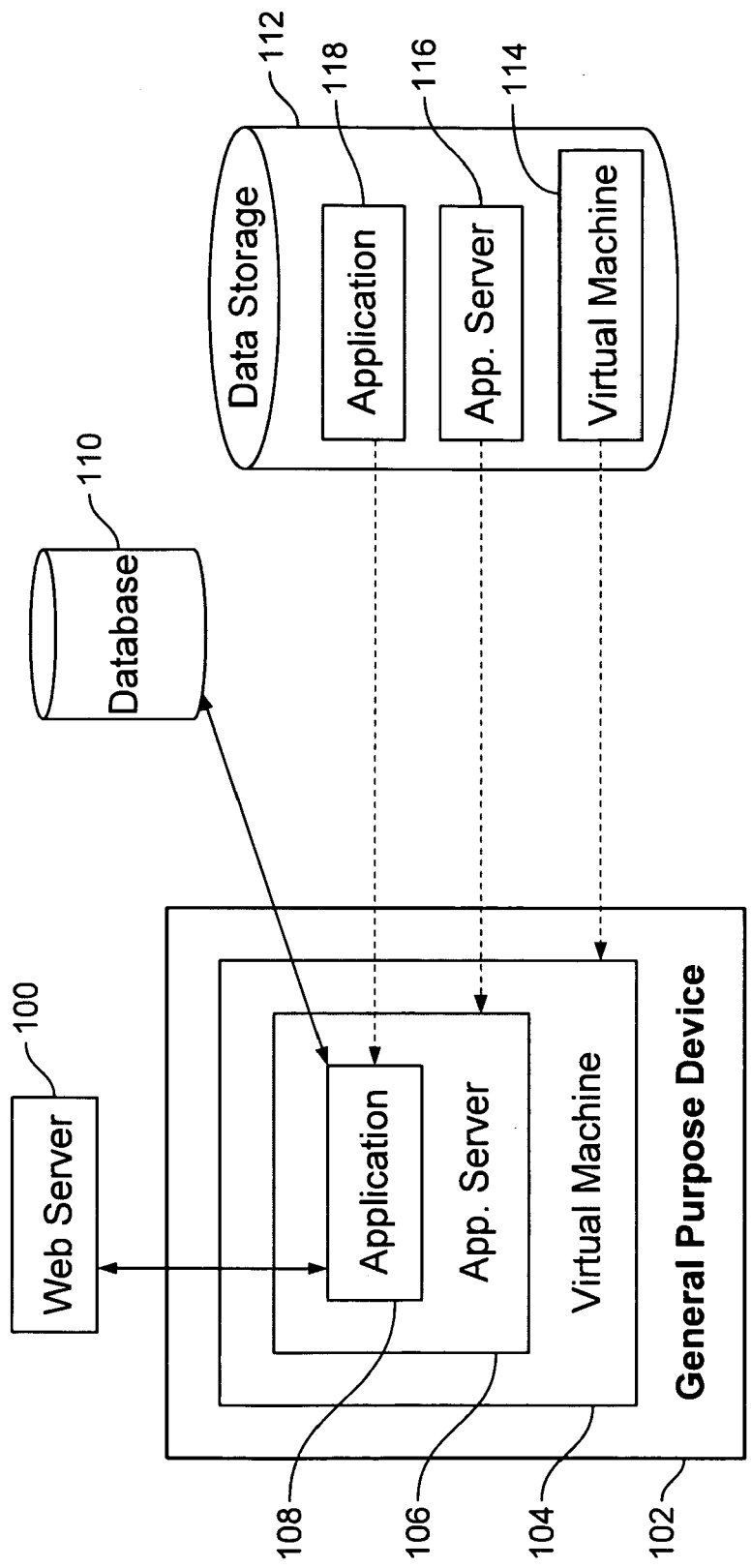
FIG. 1 is a block diagram illustrating an example system configuration for running web applications using J2EE application server frameworks.

In some embodiments, the core VM device includes specialized hardware designed to improve the performance of the core VM functionality. Many instances of core VM's executing application servers and applications can simultaneously reside on the same core VM device. The core VM device can concurrently support multiple applications invoked from heterogeneous shell VM devices. In one embodiment, a multi-processor device with specialized hardware assists the core VM functionality. The device has the capacity to concurrently support many instances of the core VM software, executing applications and application servers, simplifying administration and increasing efficiency compared to a multitude of general purpose systems as shown in FIG. 1.

In the following discussion, flowcharts are used to illustrate various processes that take place for several embodiments of the system. It should be noted that application behavior and interactions with external environment depend on the individual application implementation and may vary for other embodiments.

Figure 3:
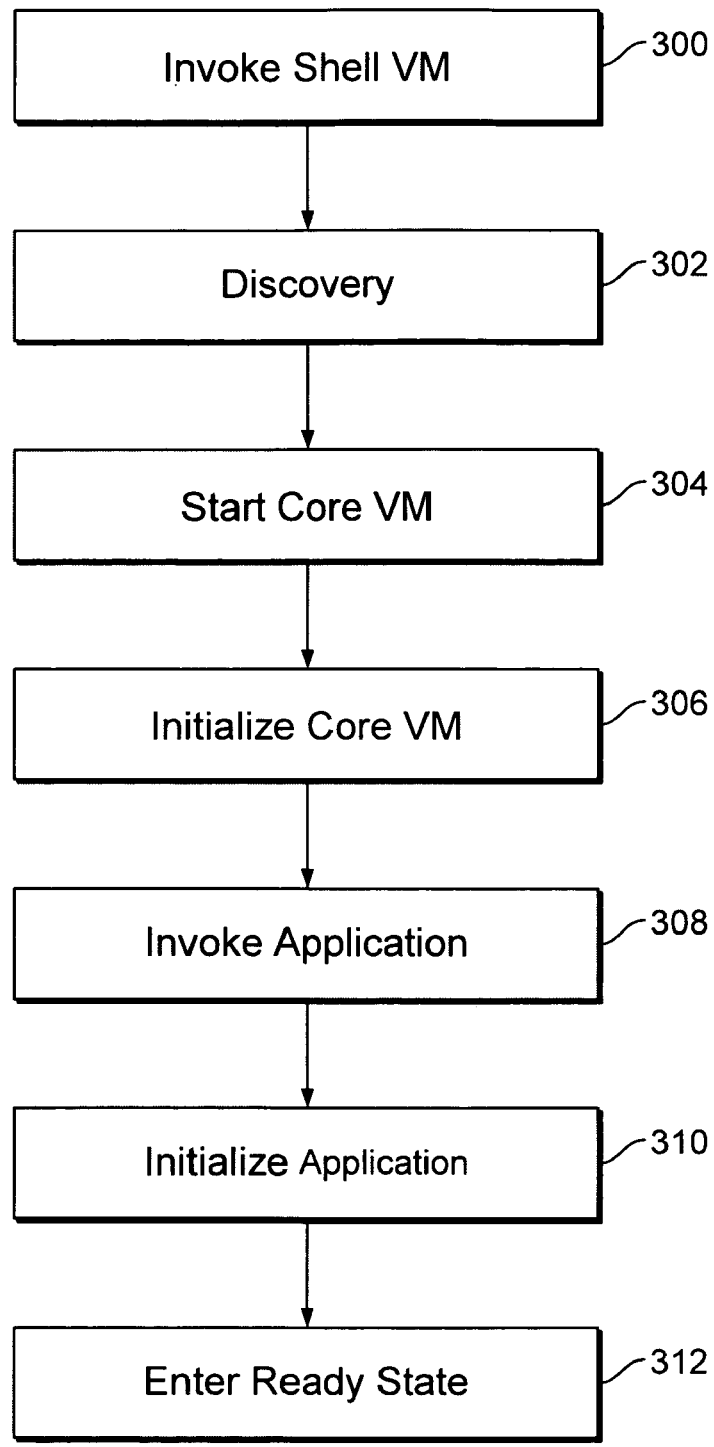
FIG. 3 is a flowchart illustrating the process of invoking an application according to one embodiment of the present invention.

FIG. 3 is a flowchart illustrating the process of invoking an application according to one embodiment of the present invention. For the purposes of this example, a shell VM and a core VM that support Java are used. It should be noted that other appropriate programming languages are supported in other embodiments. First, the shell VM is invoked on the shell VM device (300). Various methods of invoking the shell VM are supported in different embodiments, including via a command from a command line interface, an application with a graphical user interface, or a script.

In this embodiment, the shell VM is invoked by using the following command: /bin/java [VM configuration parameters] AppServerMain [application configuration parameters]. In this command, /bin/java is the execution path of the java program and points to the location of the shell VM on the data storage device. [VM configuration parameters] are optional configuration parameters that control the VM behavior. AppServerMain is the name of the main class used to start the application, and [application configuration parameters] include various configuration parameters used in the application.

Discovery of the core VM device (302) follows the invocation of the shell VM. The shell VM locates the core VM device in this step. In some embodiments, a resource manager that maintains policy information about available resources communicates with the shell VM and helps the shell VM locate a suitable core VM device. In other embodiments, the location of the core VM device could be specified in the [VM configuration parameters].

The core VM software is then started on the core VM device (304). The shell VM may deliver the core VM software from the data storage device to the core VM device, which then launches the core VM. The shell VM and the core VM establish a connection to communicate requests, responses, etc., based on a pre-defined format. In some embodiments, the core VM software is cached on the core VM device, and thus does not need to be delivered from the data storage device.

The core VM is then initialized (306). The classes needed by the core VM, including the main class and the libraries, are loaded into the core VM via file I/O operations. In this embodiment, the shell VM handles the file I/O operations and delivers the classes to be loaded by the core VM. In some embodiments, some classes may be cached on the core VM device.

The appropriate application is then invoked (308). The code for the main class of the application is loaded and executed by the core VM. The core VM loads this class and performs operations according to the program instructions.

The application is then initialized (310). The main class calls, loads, and invokes other application classes according to the instructions of the application. In this embodiment, the shell VM may need to be used to fetch the various classes by performing file I/O interactions with external devices. The application then establishes connections to various external entities including databases, name servers, and web servers. These connections are indirect connections via the shell VM. In some embodiments, some of these connections from the core VM to external entities may be direct and bypass the shell VM. In some embodiments, the application also connects to backend systems such as Siebel and SAP. The application may communicate with the backend systems via the shell VM, using networking or JNI calls.

In a typical server application, once the application is initialized it enters a ready state (312). At this point, the external applications (also referred to as clients) can make connections to the application to send requests to and receive responses from the application. Applications may open service sockets and wait for data to arrive on these sockets. The shell VM opens such service sockets for the application and relays the incoming requests to the application via the core VM.

Figure 4:
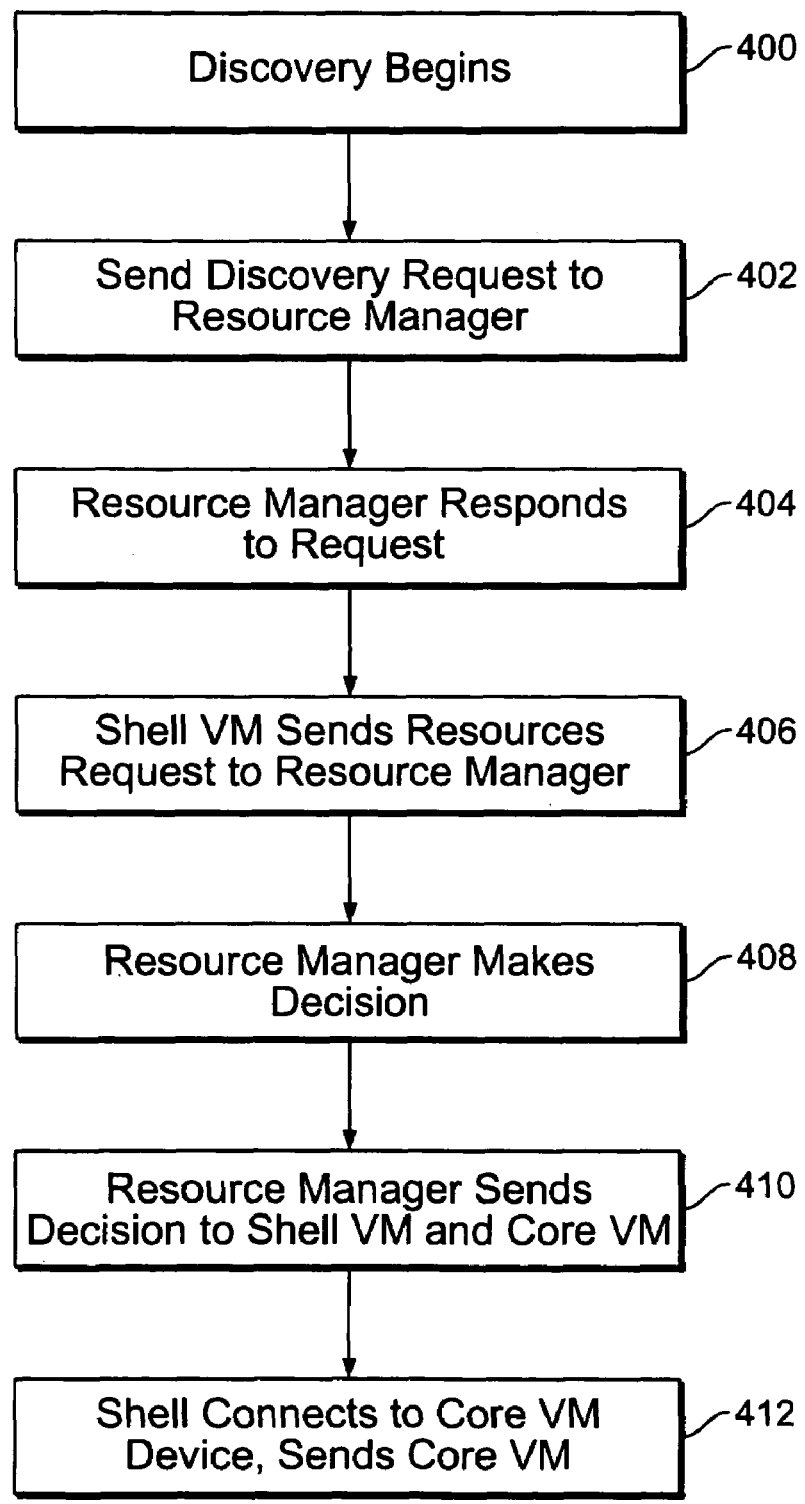
FIG. 4 is a flowchart illustrating the details of the discovery process (302) shown in FIG. 3.

FIG. 4 is a flowchart illustrating the details of the discovery process (302) shown in FIG. 3. Sometimes there is a plurality of core VM devices available in the network. The discovery process is used to locate an appropriate core VM device and assign an application and its core VM resource to it. The shell VM begins the discovery process (400). It sends a discovery request to a resource manager (402). In some embodiments, the request is sent using broadcast or multicast protocols. Multiple resource managers may exist in the network. Resource managers may reside on a general purpose device or on the core VM devices.

Resource managers respond to the request (404) by announcing their presence. The shell VM selects a resource manager out of the replying set, establishes communication with the resource manager and sends the resource manager a resource request (406). The resource request includes information about VM invocation, such as the parameters, the commands, the device and user names, etc.

The resource manager selects a core VM device to use (408) for this particular shell VM instance and determines the resource control parameters that would govern the resources available to the associated core VM on the core VM device. Generally, the resource manager maintains system configuration and resource allocation information for all the core VM devices as well as information regarding application resource usage policies. The resource manager makes policy decisions based on the information it maintains. The decision may be based on a variety of factors, including the resource request, the system configuration and the current state of the system. The resource manager sends the decision to the shell VM and in some cases the core VM device (410). The shell VM then connects to the core VM device based on the decision, and sends the core VM device the core VM software (412).

Figure 5:
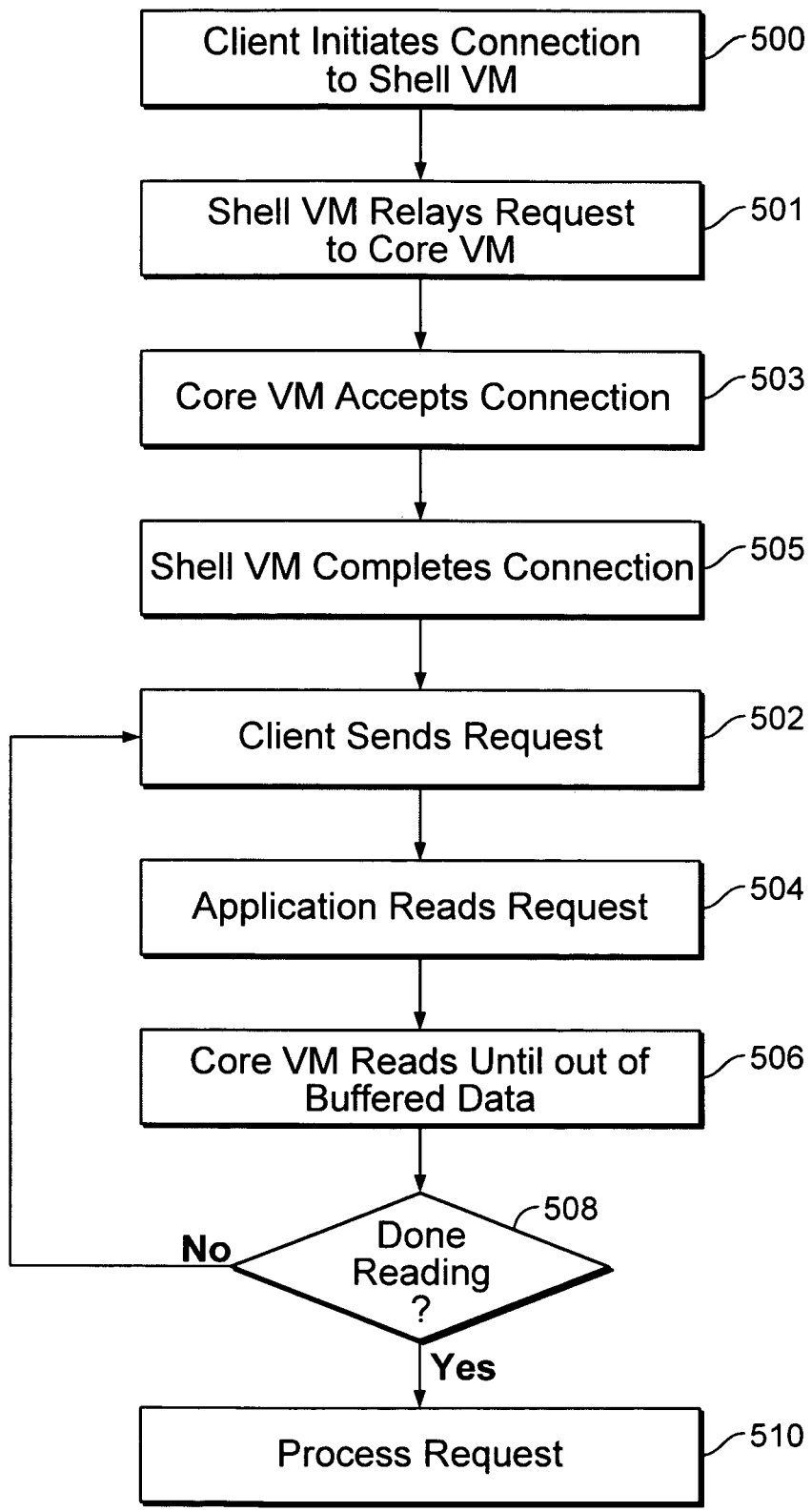
FIG. 5 is a flowchart illustrating the processing of a client initiated request in a server application, according to one embodiment of the present invention.

FIG. 5 is a flowchart illustrating the processing of a client initiated request in a server application, according to one embodiment of the present invention. A "get" request from the client is used for the purposes of this example. When a client is ready to make a request, it connects to the shell VM and opens a socket (500). The shell VM relays the client request to the core VM (501). When the core VM accepts the connection (503), it uses the shell VM to complete the connection to the client (505).

The client then sends a packet that includes information about the "get" request (502). In one embodiment, the shell VM relays the whole packet to the core VM. The core VM buffers the packet, and notifies the application that data is available. Within the core VM, the application reads bytes from a core VM buffer (504). It continues to read more bytes until there is no more data in the buffer (506). It is then determined whether the application has finished reading the request (508). If it has not, control is transferred to step 502 and more data is sent and buffered. If the application has finished reading the request, it will go on to process the request (510).

Figure 6:
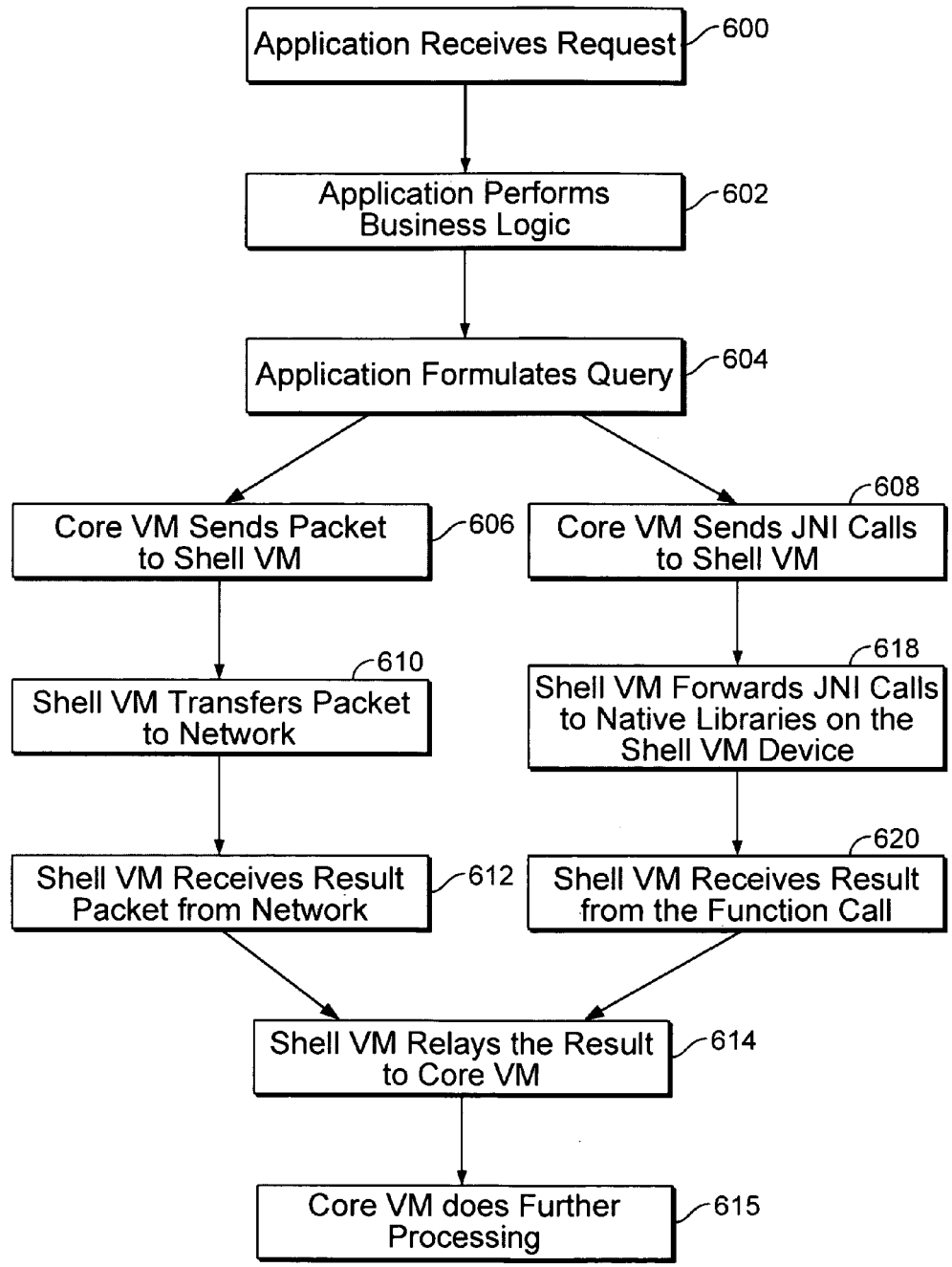
FIG. 6 is a flowchart illustrating an example callback from the core VM to the shell VM in response to a client request, according to one embodiment of the present invention.

FIG. 6 is a flowchart illustrating an example callback from the core VM to the shell VM in response to a client request, according to one embodiment of the present invention. A client request that causes a database query is used for the purposes of this example. An application running inside the core VM gets a request from a client (600), and the business logic operations associated with the request are carried out subsequently (602). A query is formulated based on business logic requirements (604), and then sent to the shell VM either as a set of networking packets (606) or as one or more JNI calls (608).

If a query is sent as packets to the shell VM (606), then the shell VM transfers these packets to the network (610). The database that is queried then sends back the results, which are encapsulated in packets according to a pre-defined scheme. The shell VM receives the result packets from the network (612), and then relays the result to the core VM (614) to complete any further processing (615).

Upon receiving a JNI call from the application, the core VM forwards the call to the shell VM (608). The shell VM then forwards the JNI calls to native libraries on the shell VM device, which perform operations according to the JNI calls (618). The shell VM receives the result from the function call to the native libraries (620). The shell VM then relays the result to the core VM (614) to complete any further processing (615).

Figure 7:
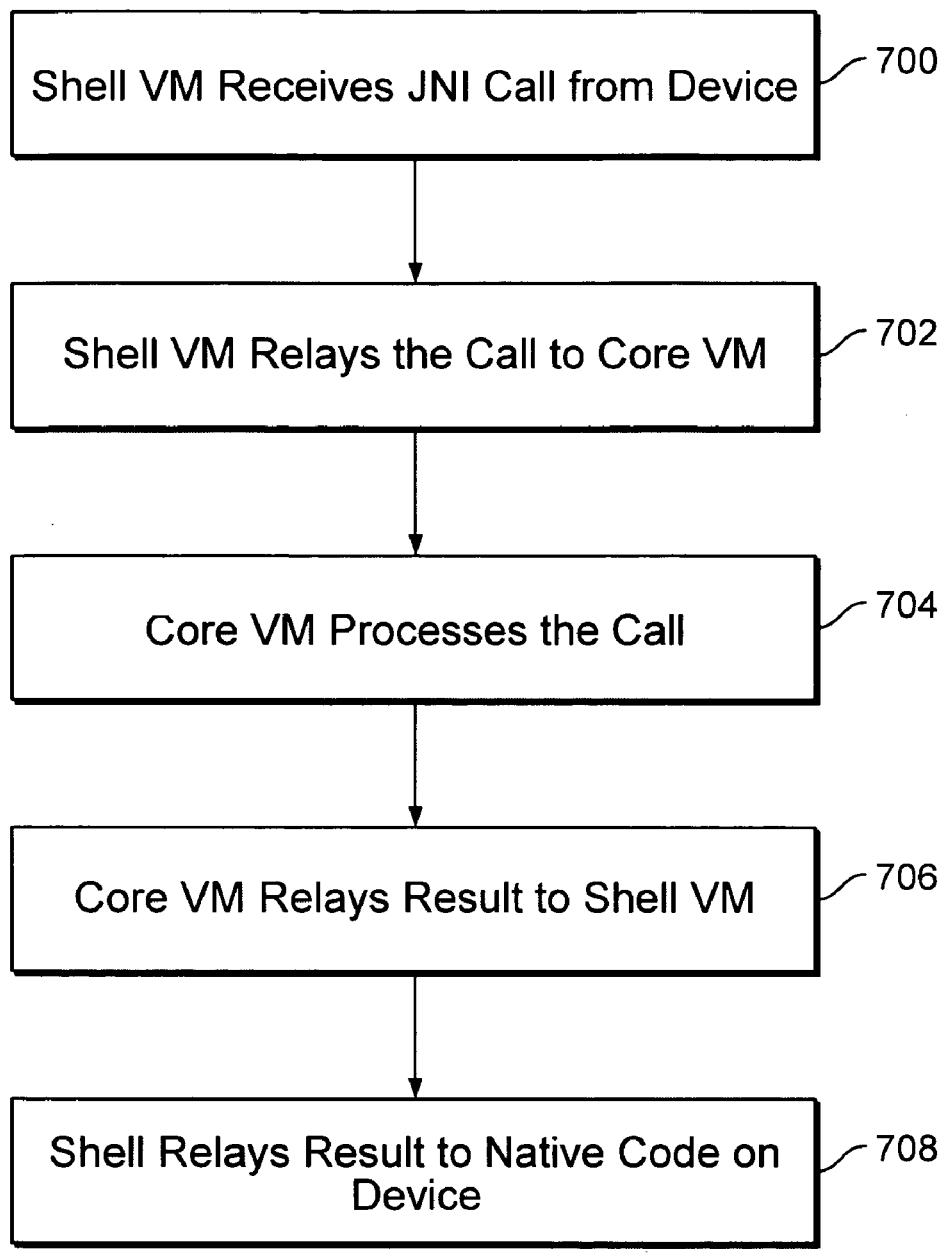
FIG. 7 is a flowchart illustrating an example callback from native code running on the shell VM device to the application running on the core VM.

FIG. 7 is a flowchart illustrating an example callback from native code running on the shell VM device to the application running on the core VM. The shell VM receives a JNI callback made by native code on the shell VM device (700). It relays the call to the core VM (702). The core VM processes the call and performs any business logic necessary to produce the desired result (704). The core VM sends the result back to the shell VM (706), and the shell VM relays the result back to the native code on the shell VM device (708).

Figure 8A:
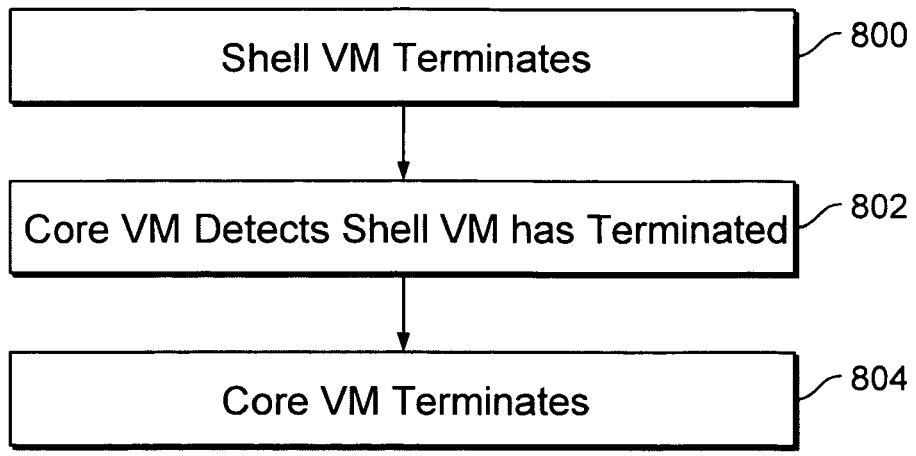
FIG. 8A is a flowchart illustrating an abrupt termination process according to one embodiment of the present invention.

In some embodiments, the shell VM terminates after some operations are completed. The core VM is terminated as well. The system is designed to handle both abrupt termination (shell VM terminates abruptly without notifying the core VM) and planned termination (shell VM terminates and gives the core VM notification). FIG. 8A is a flowchart illustrating an abrupt termination process according to one embodiment of the present invention. First, the shell VM terminates (800). The core VM continuously monitors the shell VM's activities by using a heartbeat. Once the heartbeat ceases, the core VM detects that the shell VM has shut down (802), the core VM then terminates (804).

Figure 8B:
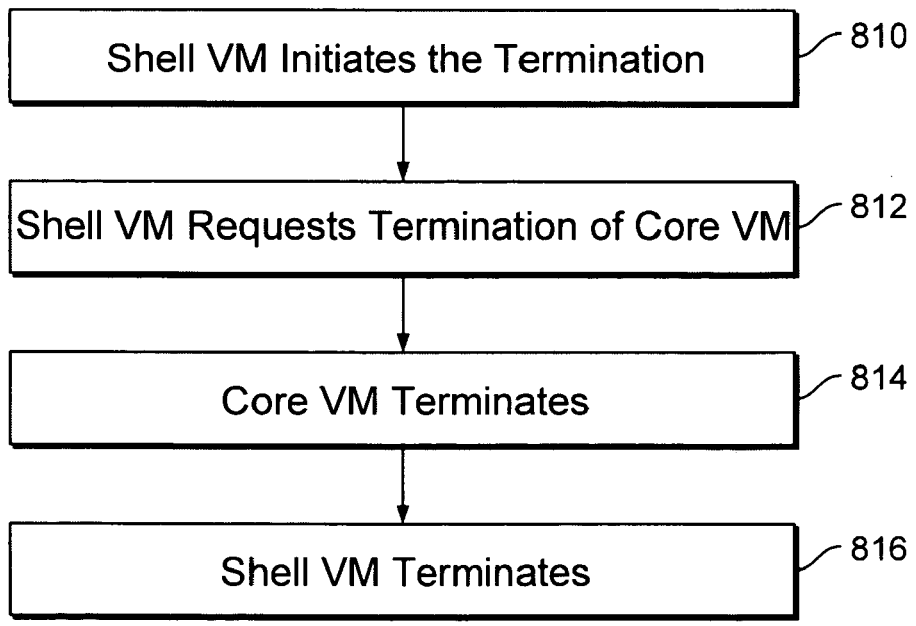
FIG. 8B is a flowchart illustrating a planned termination process according to one embodiment of the present invention.

FIG. 8B is a flowchart illustrating a planned termination process according to one embodiment of the present invention. First, the shell VM initiates its termination (810). It sends a message to the core VM requesting the core VM to be terminated (812). Upon receiving the request, the core VM terminates (814). Finally the shell VM finishes its own termination (816).

Figure 9A:
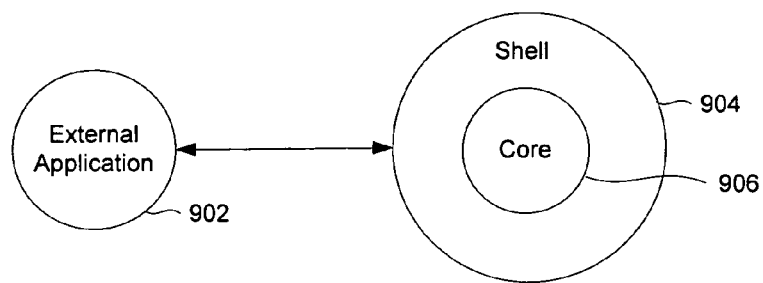
FIGS. 9A-9C are diagrams illustrating various interactions among shell VM's, core VM's, and external applications.
Figure 9B:
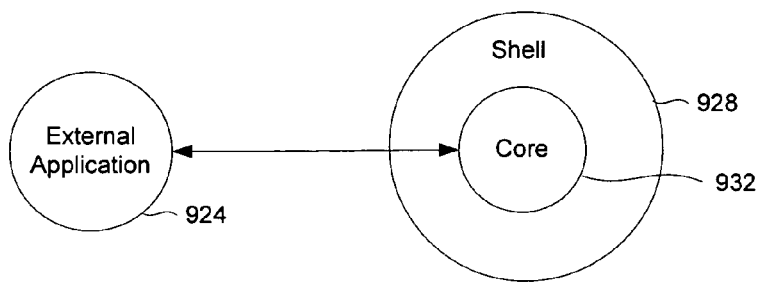
Figure 9C:
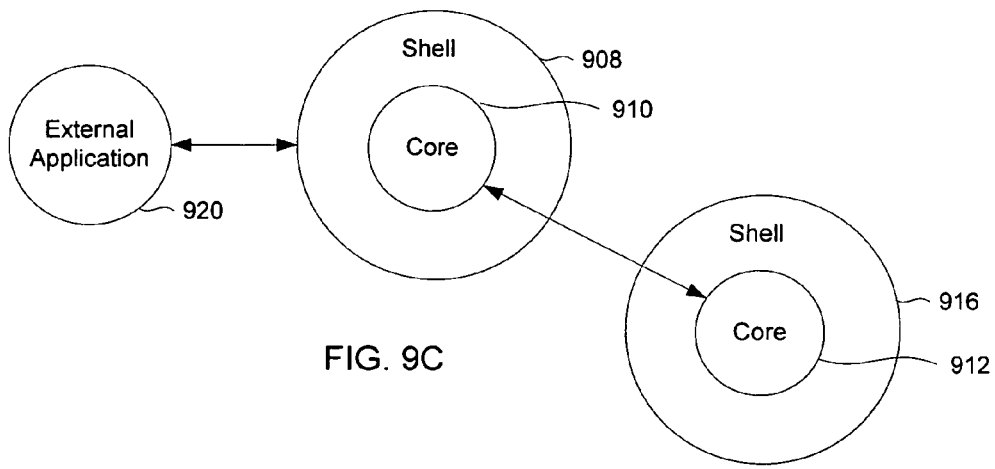

FIGS. 9A-9C are diagrams illustrating various interactions among shell VM's, core VM's, and external applications. FIG. 9A shows one embodiment of a segmented VM. Shell VM 904 is specifically allocated to external application 902. Shell VM 904 acts as an interface between application 902 and core VM 906. Shell VM 904 offloads onto core VM 906 some of the tasks required by calls from external application 906. For example, external application 902 may forward calls to shell VM 904, which then forwards certain calls to core VM 906. Tasks that may be offloaded include data processing, memory access and management, or I/O functions. Preferably, shell VM 904 offloads almost all of its tasks to core VM 906.

Segmentation into a shell VM 904 and core VM 906 may be transparent to external application 902; that is, external application 902 may be unaware of any VM segmentation. Alternatively, the VM segmentation may be known by external application 902. As such, external application 902 may be specifically written for a segmented VM.

In some embodiments, shell VM 904 interprets operating system (OS) specific instructions and controls security, such as whether a particular connection is allowed or whether a file can be accessed. Core VM 906 is not necessarily OS specific, and thus many non OS specific tasks such as data processing can be passed to it.

The shell VM does not necessarily need to intercept all communication between the core VM and the external application, as shown in FIG. 9B. In this example, external application 924 is shown to bypass shell VM 928 and communicate directly with core VM 932. This may occur when I/O functions are moved from shell VM 928 to core VM 932. In some embodiments, external application 924 may communicate directly with core VM 932 using a shell bypass method, as further described in U.S. patent application Ser. No. 10/823, 414 which is incorporated by reference above.

A core VM may communicate directly with another core VM, as shown in FIG. 9C. In this example, core VM 910 is shown to communicate directly with core VM 912. For example, there may be an instance of an application running on each of the two core VM's that communicate with each other to exchange state so that if one crashes, the other one takes over. As in FIG. 9A, shell VM 908 interfaces with external application 920, while core VM 910 handles some of the tasks required by calls from the external application.

Non-transparent VM segmentation, where the program running within the segmented VM knowingly controls external communications paths that bypass the shell VM can be done via specific Application Programming Interfaces (APIs) or protocols exposed by the segmented VM, that are intentionally called by the running program. This behavior may be useful for bypass communications directly to another outside program or service (e.g. database connections, messaging services), or for tight coordination between two segmented VM based programs, running on separate segmented VMs (e.g. AppServer state clustering, message bus traffic, etc.).

A segmented VM may expose APIs or other control mechanisms to the running programs that allow it to open communications paths originating or terminating in the core VM, that communicate directly with the "outside world" (bypassing the shell VM). APIs may be used to coordinate between two (or more) programs running on separate segmented VMs, and establish a direct communication channel between their core VMs that bypasses their shell VMs. APIs may be used by a program running on a segmented VM to communicate directly with an outside service from the core VM, bypassing the shell VM.

Core VM's 906, 932, and 910, and 912 may reside on the same device or a plurality of devices. A device can include a full computer system, a processor, an application specific integrated circuit (ASIC), or any other appropriate device. The resources from these core devices, such as processing power, memory, and I/O, can be aggregated and shared among a plurality of shell VM's. As used herein, a collection of core device resources is referred to as a core space. A core space can include one or more core device resources. As used herein, resources associated with one core device are referred to as a core subspace. One core device can include one or more core subspaces. As such, a core space can include one or more core subspaces on one or more core devices. The core space can include portions specifically allocated to core VM's and portions that are generally allocated. The portions that are generally allocated can be allocated based on a policy, such as a load sharing scheme. The portions that are specifically allocated are allocated to specific core VM's. In some embodiments, multiple core spaces are combined into a "core space domain", as more fully described below.

Figure 10:
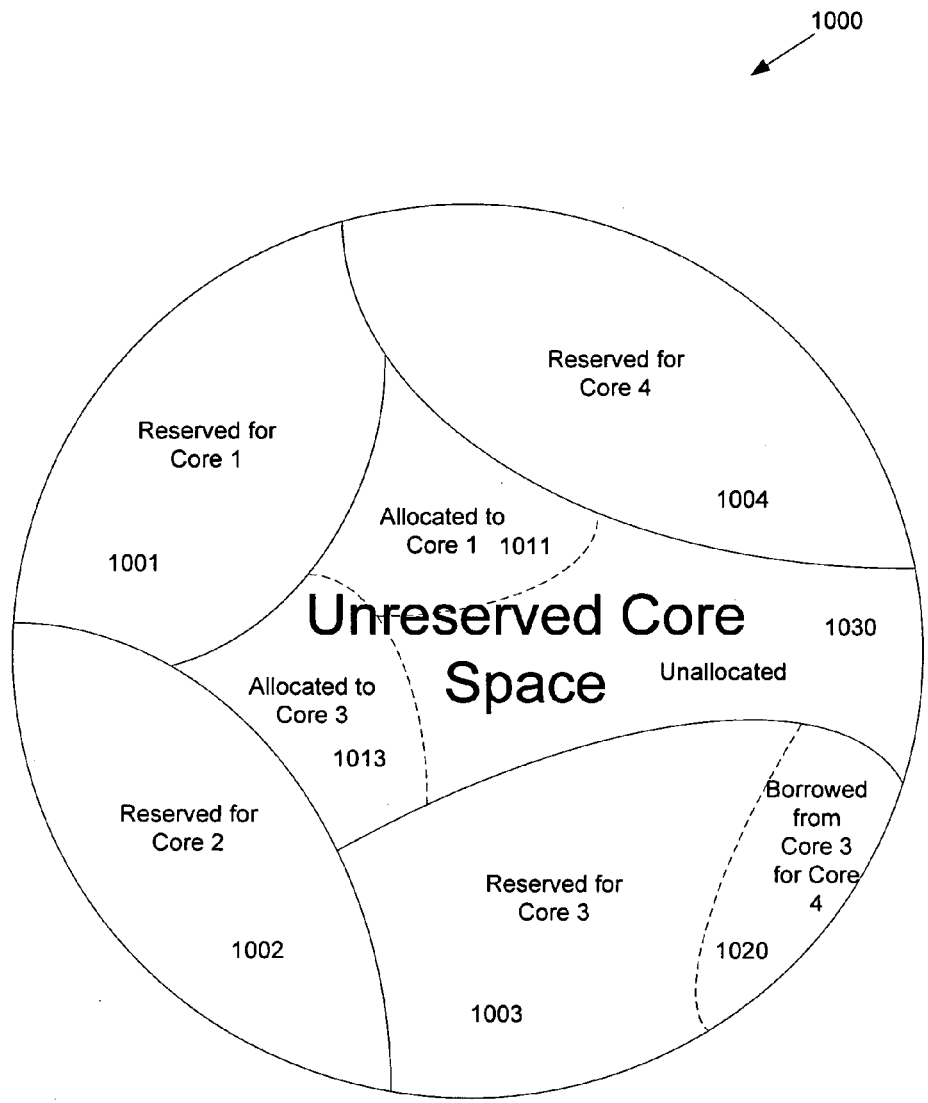
FIG. 10 is a block diagram illustrating the allocation of a core space according to some embodiments.

FIG. 10 is a block diagram illustrating the allocation of a core space according to some embodiments. In this example, core space 1000 represents a collection of core resources on a core device, i.e., core space 1000 is a core subspace. Some examples of these resources include processing power (number of CPU's), memory, and I/O capacity. In this example, core space 1000 is divided into several portions. Portions 1001, 1002, 1003, and 1004 are reserved for use by core VM's 1, 2, 3, and 4, respectively. Portions that are reserved are guaranteed to be available for use by the assigned core VM. Reserved resources can be borrowed temporarily for use by another core VM. For example, if core VM 4 requires extra resources in addition to reserved portion 1004, it may borrow the extra resource from portions that are reserved by other core VM's. Portion 1020 is shown as borrowed from portion 1003, which was originally reserved for core VM 3, for use by core VM 4. However, if core VM 3, requires the reserved resources in portion 1020, the borrowed portion is given back by core VM 4. For this reason, CPU's and I/O can easily be borrowed. Memory borrowing is possible when the borrowing core VM can guarantee to relinquish the borrowed memory upon request.

The remaining space includes portions 1011, 1013, and 1030. This space is referred to as unreserved core space because it is available to be allocated among the core VM's as appropriate. For example, there may be a load balancing or load sharing scheme that is used to allocate the unreserved core space among various core VM's. Accordingly, the lines within core space 1000 may dynamically grow and shrink with time.

Figure 11A:
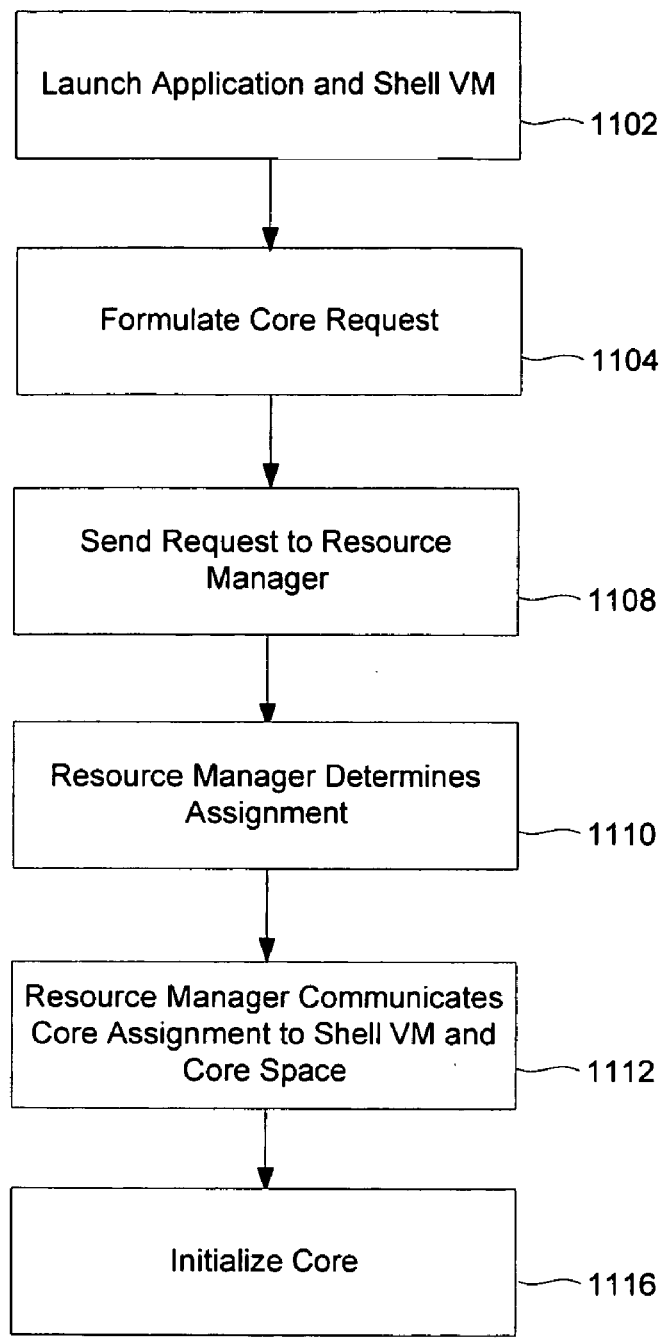
FIG. 11A is a flowchart illustrating a process of allocating core resources for a new shell VM, according to some embodiments.

FIG. 11A is a flowchart illustrating a process of allocating core resources (e.g., a core subspace) for a new shell VM, according to some embodiments. This is a more generalized embodiment of the discovery process shown in FIG. 4. Initially, an application and its corresponding shell VM are launched (1102). There are various ways in which the shell VM can be launched. For example, the application can launch a shell VM instead of a non-segmented Java VM (JVM). Next, a core VM request is formulated (1104). The request can include information about the particular shell VM, such as user name, shell device address, required resources, and redundancy information. The information can be sent as command line parameters or read from a configuration file. The request is then sent to a resource manager (1108). The resource manager may include a core allocator that processes the request and any pertinent information to determine an assignment (1110) based on a policy. For example, the resource manager may be preconfigured to reserve certain amounts of memory, CPU and I/O resources to requests associated with certain shell devices. As another example, the resource manager may be preconfigured to maintain application availability (redundancy) by placing core VM's on core VM devices such that no single core VM device failure will disrupt all segmented VM's launched from a specific set of shell VM devices. As a third example, the resource manager may be preconfigured to assign resources for certain user names to a specific pool of core VM devices. Once a decision is made, the core resource assignment is communicated to the shell VM and/or the core space (1112). The assignment information can include parameters such as minimum allocation, maximum allocation, priority, CPU, memory and I/O capacity. This information is used to initialize the core VM (1116) according to the assignment as well as establish parameters for the core space to perform ongoing resource allocation. The shell VM can then establish communication with the core VM.

Figure 11B:
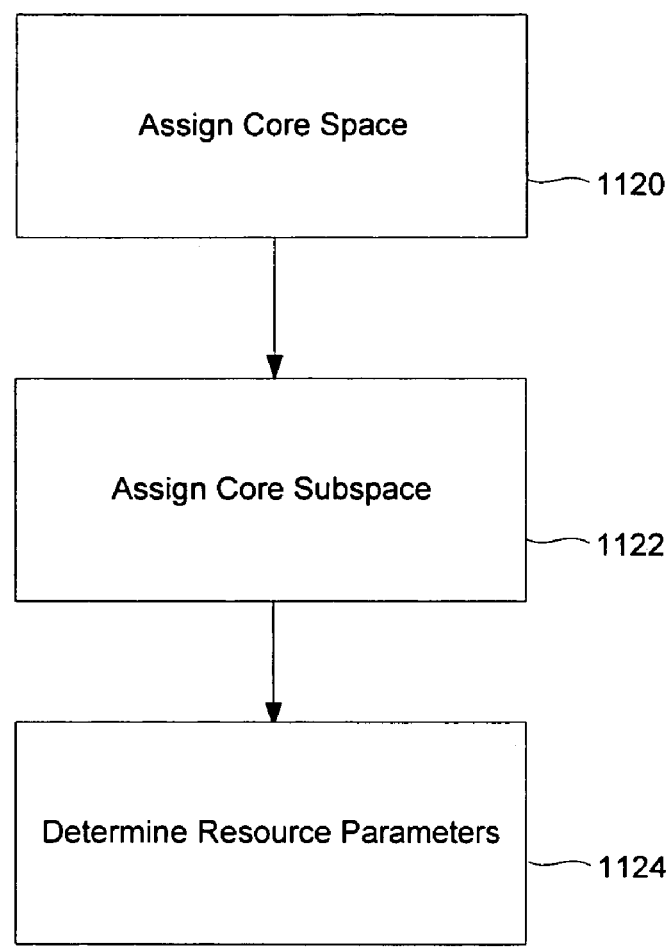
FIG. 11B is a flowchart illustrating a process of determining an assignment of core resources for a new shell VM, according to some embodiments.

FIG. 11B is a flowchart illustrating a process of determining an assignment of core resources (e.g., a core subspace) for a new shell VM, according to some embodiments. In some embodiments, this process is used to perform (1110) of FIG. 11A. In this example, multiple core spaces are combined into a core space domain managed by a single core space allocator. In this example, a core space from the core space domain is assigned (1120). For example, the core space allocator determines a core space and resource settings for the core VM based on a policy. A core subspace from the core space is assigned (1122). For example, the core space allocator determines a core subspace (on a core device) for the core VM according to policy rules and resource availability (e.g., redundancy requirements or resource needs may eliminate some core devices in a core space from being good placement candidates). Resource parameters for the core subspace are determined (1124). For example, the core allocator may determine the resource parameters. In some embodiments, a core allocation enforcer enforces the resource parameters, as more fully described below.

Figure 12:
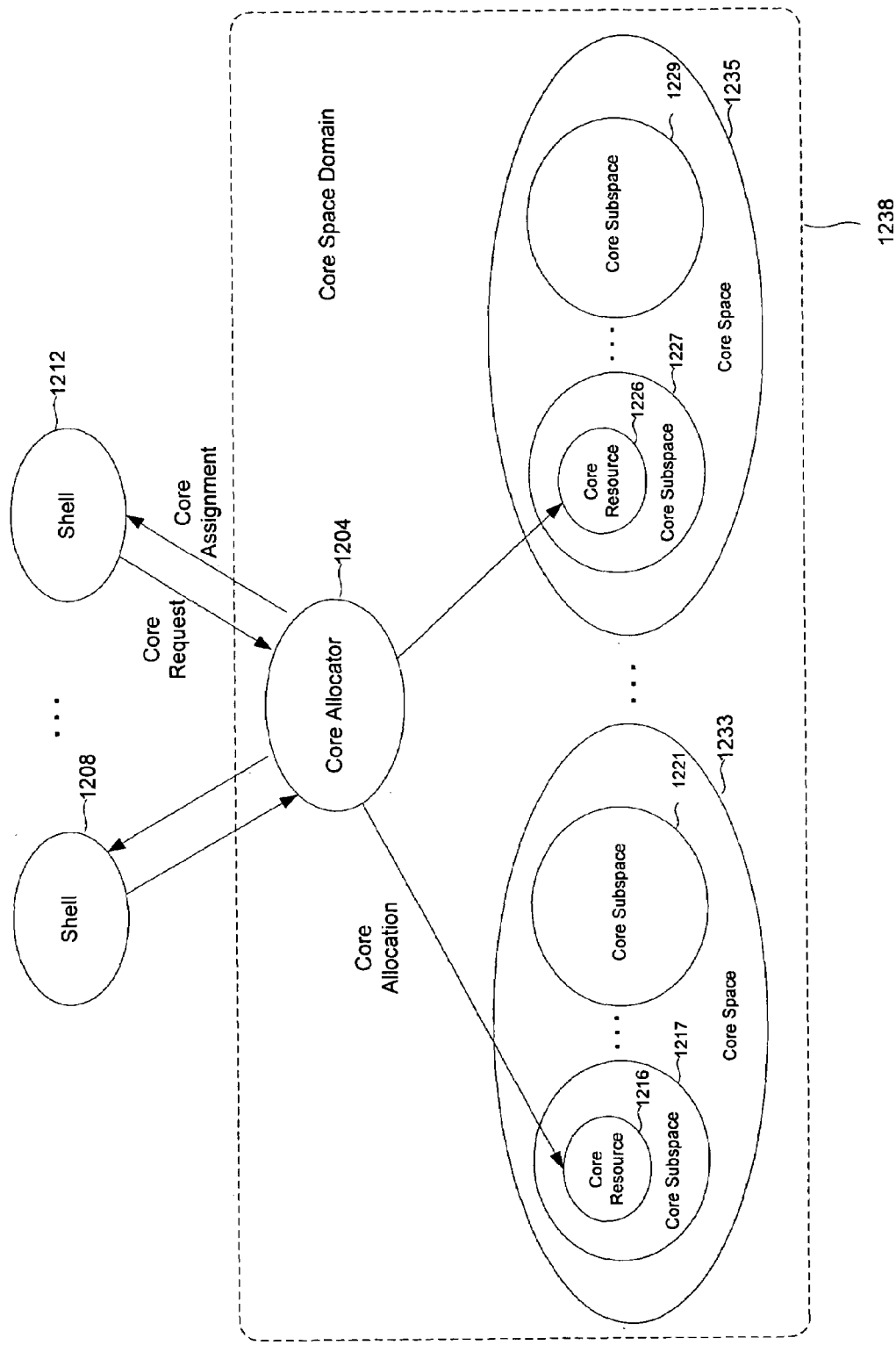
FIG. 12 is a block diagram illustrating the allocation of core resources for a new shell VM according to some embodiments.

FIG. 12 is a block diagram illustrating the allocation of core resources for a new shell VM according to some embodiments. In this example, core space domain 1238 is shown to include core allocator 1204 and core space 1233 to core space 1235. Core space domain 1238 may include any number of core spaces. Core space 1233 is shown to include core subspace 1217 to core subspace 1221. Core space 1233 may include any number of core subspaces. Each of core subspace 1217 to core subspace 1221 resides on a core device. A core device may include more than one of core subspace 1217 to core subspace 1221. Core resource 1216 within core subspace 1217 is shown to be allocated by core allocator 1204.

Similarly, core space 1235 is shown to include core subspaces 1227-1229. Core space 1235 may include any number of core subspaces. Each of core subspace 1227 to core subspace 1229 resides on a core device. A core device may include more than one of core subspace 1227 to core subspace 1229. Core resource 1226 within core subspace 1227 is shown to be allocated by core allocator 1204.

In some embodiments, core resources 1216 and 1226 are similar to the portions shown in FIG. 10. A new shell VM 1212 is launched when an application is launched. A core VM request is formulated by shell VM 1212. The request is sent to core allocator 1204. Based on a policy, core allocator 1204 assigns core resource 1216 to shell VM 1212 and the assignment information is sent to the shell VM and/or to the core subspace 1217. In some embodiments, core allocation information may also be sent to core resource 1216. In some embodiments, core allocator 1204 assigns core resource 1216 according to the process shown in FIG. 11A. Similarly, shell VM 1208 can be assigned core resource 1226.

Figure 13:
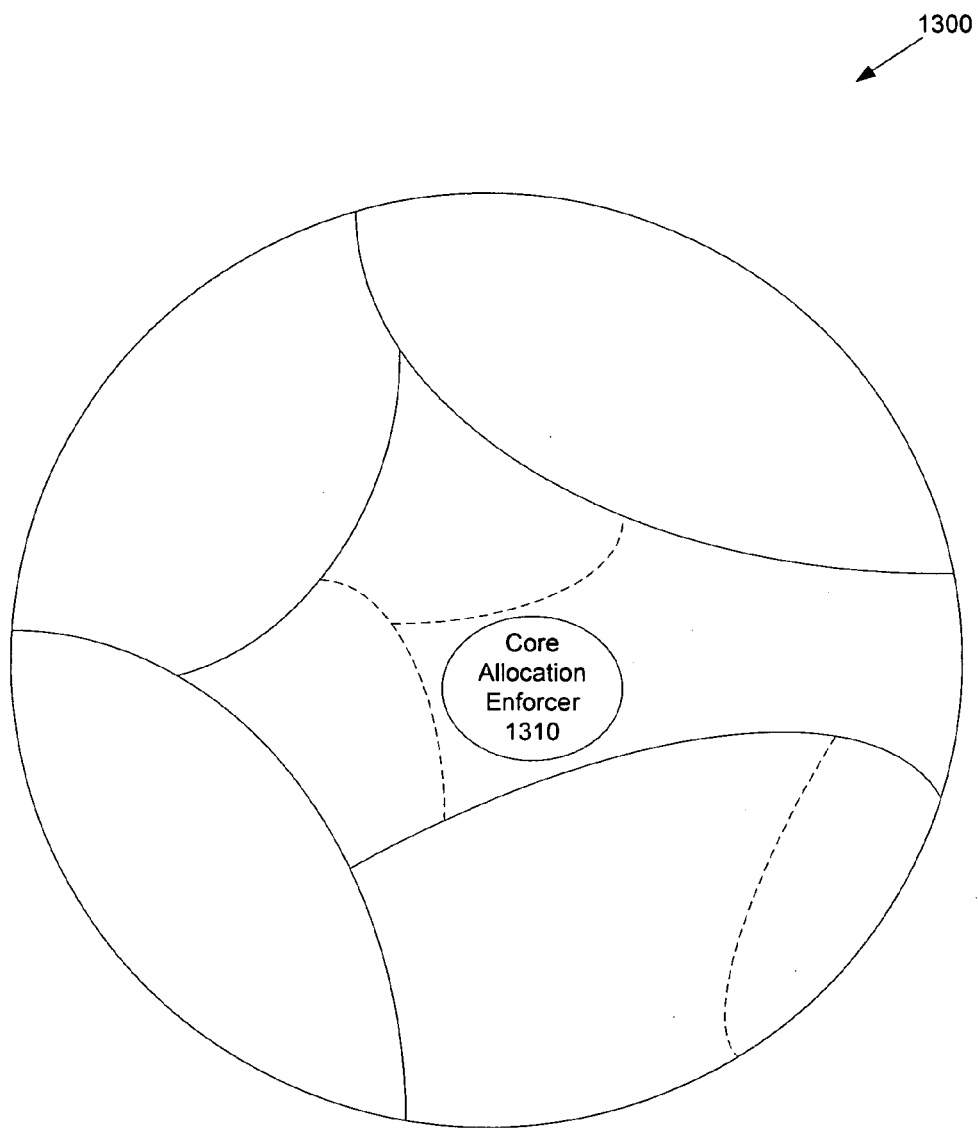
FIG. 13 is a block diagram illustrating a core allocation enforcer 1310 within a core space 1300.

Once the core space resource is initially allocated, a core allocation enforcer is used in some embodiments to enforce the allocation of resources within each core subspace. In some embodiments, the core allocation enforcer may be part of the resource manager. FIG. 13 is a block diagram illustrating a core allocation enforcer 1310 within a core space 1300. In this example, core space 1300 represents a collection of core resources on a core device, i.e., core space 1300 is a core subspace. Core allocation enforcer 1310 is shown to reside within core space 1300 but may reside on a separate device or in any other appropriate location. Core allocation enforcer 1310 ensures that resources are returned to the unreserved core space or borrowed resources are returned as appropriate. For example, core allocation enforcer 1310 can return borrowed processing power when an application from which that processing power has been borrowed requests it. When an application releases memory, core allocation enforcer 1310 can provide the released memory to another process. Core allocation enforcer 1310 may also request memory from an application to handle a memory request. Core allocation enforcer 1310 may analyze the core space to optimally rebalance the distribution of resources on a periodic or event driven basis. In some embodiments, memory is managed according to the methods described in U.S. patent application Ser. No. 10/701,388, entitled MEMORY MANAGEMENT which is incorporated by reference above.

Figure 14:
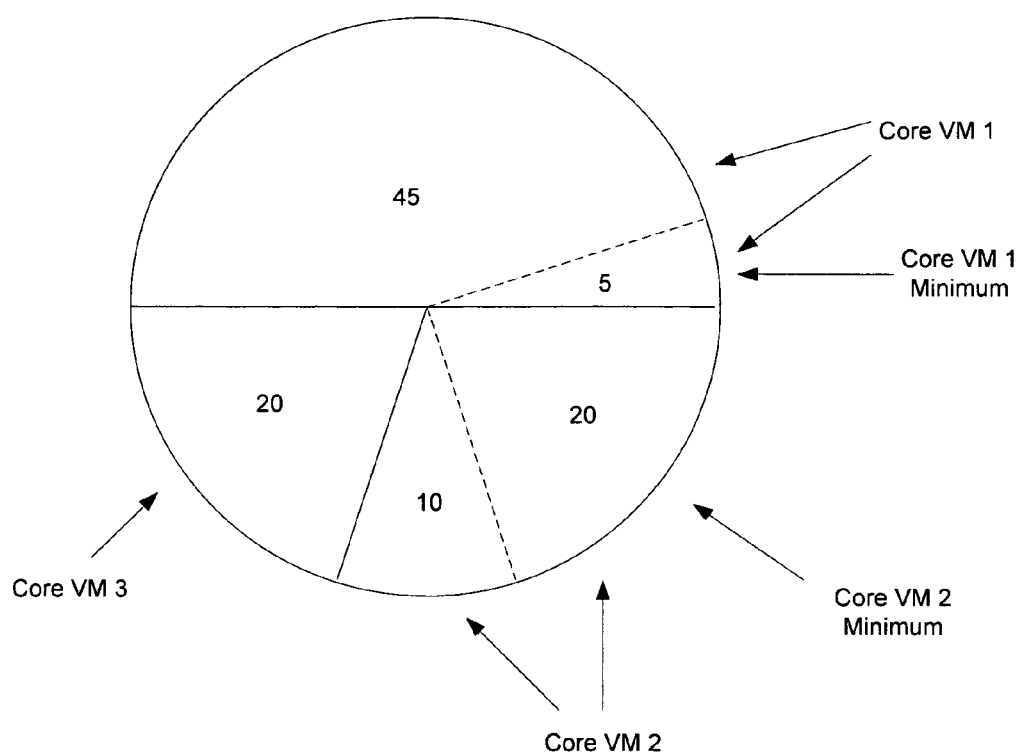
FIG. 14 is a flowchart illustrating an example of an allocation of CPU processing power within a core subspace.

FIG. 14 is a flowchart illustrating an example of an allocation of CPU processing power within a core subspace. In some embodiments, a core allocation enforcer performs this allocation, as described above. This process can happen periodically, on a request, or based on an event, with the purpose of maintaining ongoing resource allocation within a core subspace, according to previously communicated core resource assignment information. In this example, processing power is the resource shared among core VM's. When triggered, the core allocation enforcer determines the number of runnable threads in each of the core VM's within a particular core subspace. First, each core VM is given the number of CPU's equal to the minimum of its runnable threads or its minimum CPU allocation. Any remaining CPU's will be distributed between the core VM's according to weighted priority, or any other policy that might be in effect, while ensuring that no core VM will receive more than its maximum CPU allocation. For example, assume that the aggregate processing power available for use by all core processes is 100 CPU's. In this example, also assume that there are three core VM's contending for the core CPU resources, with the following configuration. Core VM 1, has a minimum CPU allocation of 5, maximum CPU allocation of 50 and a weighted priority of 100. Core VM 2 has a minimum CPU allocation of 20, maximum CPU allocation of 50 and a weighted priority of 1. Core VM 3 has a minimum CPU allocation of 0, maximum CPU allocation of 40 and a weighted priority of 2. At the current time of evaluating, core VM 1 has 80 runnable threads, core VM 2 has 50 runnable threads and core VM 3 has 60 runnable threads. By using the method described above, the CPU allocations for the three core VMs will be as follows: Core VM I will be allocated 50 CPUs, Core VM2 ends up with 30 CPUs, and core VM 3 is allocated the remaining 20 CPUs, as shown in FIG. 14

The core allocator may make placement (i.e., assignment of a core VM to a core space) decisions and allocation of resources between (and within) core VM devices and core spaces. For example, the core allocator may maintain a configurable policy that ensures that stated resource requirements are met and reservations made to guarantee those requirements; stated application redundancy requirements are met (e.g., as in the redundancy example provided above); stated resource limits are imposed, restricting application resources even when idle resources exist; and stated pooling/placement of resources is met, assigning applications to one of a specified subset of devices.

The core VM compute resources can be "virtualized" by using such a policy-based allocation of core VM resources and target core VM devices. For example, specification of a target core device by a launching application (when it starts a shell VM) is not necessary to receive an assignment. Core devices may be added to a core space by describing them to the allocator, and without reconfiguring any application or application parameters. A core device failure may be recovered without application reconfiguration. For example, the core allocator may use a policy to select another core device. The addition of applications, changes to policies, addition/removal of core VM devices, may be performed without reconfiguration of applications or application parameters. For example, a policy engine may re-shuffle placement decisions and reservations between available devices to make a new policy, make new applications fit, and adapt placement to changes in available core VM device capacities.

An improved virtual machine (VM) system and its associated methods have been disclosed. A shell VM and a core VM are used to segment the overall functionality of a conventional VM. The segmented design improves scalability and efficiency, simplifies administration, and transparently integrates with existing systems.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A segmented virtual machine (VM) executing within one or more computer systems, the segmented virtual machine comprising:
   a plurality of core VM's implemented in a common core space; and a plurality of shell VM's each associated with a core VM; wherein:
  the plurality of core VM's each perform VM internal execution functions;
  the plurality of shell VM's each perform interactions with an external environment and are configured to forward certain calls from the external environment to its associated core VM;
  the plurality of core VM's and the plurality of shell VM's cooperate to form the segmented VM; and
  resources of the common core space are allocated among the core VM's according to a policy indicating resource requirement of the plurality of core VM's, the resource requirement including priority information pertaining to each of the plurality of core VM's.

2. A segmented VM as recited in claim 1 wherein the resources are dynamically allocated among the core VM's.

3. A segmented VM as recited in claim 1 wherein the resources include memory.

4. A segmented VM as recited in claim 1 wherein the resources include processing power.

5. A segmented VM as recited in claim 1 wherein the resources include I/O.

6. A segmented VM as recited in claim 1 wherein the core space resides on a plurality of physical devices.

7. A segmented VM as recited in claim 1 wherein the core space includes a portion allocated to a core VM.

8. A segmented VM as recited in claim 1 wherein the core space includes a portion reserved for a core VM.

9. A segmented VM as recited in claim 1 wherein the core space includes a portion borrowed for a core VM.

10. A segmented VM as recited in claim 1 wherein the core space includes portions that are specifically allocated.

11. A segmented VM as recited in claim 1 wherein the core space includes portions that are generally allocated.

12. A segmented VM as recited in claim 1 wherein the core space includes a portion that is unallocated.

13. A segmented VM as recited in claim 1 further including a resource manager that allocates a portion of the core space to a core VM based on the policy.

14. A segmented VM as recited in claim 1 further including a core allocation enforcer that enforces an allocation of the core space to a core VM based on the policy.

15. A method of executing a segmented virtual machine (VM) comprising:
  implementing a plurality of core VM's in a common core space; wherein:
    each core VM is associated with a shell VM;
    each core VM performs VM internal execution functions;
    each shell VM performs VM interactions with an external environment and are configured to forward certain calls from the external environment to its associated core VM; and
    the plurality of core VM's and the plurality of shell VM's cooperate to form the segmented VM; and
  allocating resources of the common core space among the core VM's according to a policy indicating resource requirement of the plurality of core VM's, the resource requirement including priority information pertaining to each of the plurality of core VM's.

16. A method as recited in claim 15 wherein the resources are dynamically allocated among the core VM's.

17. A method as recited in claim 15 wherein the resources include memory.

18. A method as recited in claim 15 wherein the resources include processing power.

19. A method as recited in claim 15 wherein the resources include I/O.

20. A method as recited in claim 15 wherein the core space resides on a plurality of physical devices.

21. A method as recited in claim 15 wherein the core space includes a portion allocated to a core VM.

22. A method as recited in claim 15 wherein the core space includes a portion reserved for a core VM.

23. A method as recited in claim 15 wherein the core space includes a portion borrowed for a core VM.

24. A method as recited in claim 15 wherein the core space includes portions that are specifically allocated.

25. A method as recited in claim 15 wherein the core space includes portions that are generally allocated.

26. A method as recited in claim 15 wherein the core space includes a portion that is unallocated.

27. A method as recited in claim 15 further including allocating a portion of the core space to a core VM based on the policy.

28. A method as recited in claim 15 further including enforcing an allocation of the core space to a core VM based on the policy.

29. A computer program product for executing a segmented virtual machine (VM), the computer program product being embodied in a computer readable storage medium and comprising computer instructions for:
  implementing a plurality of core VM's in a common core space; wherein:
    each core VM is associated with a shell VM;
    each core VM performs VM internal execution functions;
    each shell VM performs VM interactions with an external environment and are configured to forward certain calls from the external environment to its associated core VM; and
    the plurality of core VM's and the plurality of shell VM's cooperate to form the segmented VM; and
  allocating resources of the common core space among the core VM's according to a policy indicating resource requirement of the plurality of core VM's, the resource requirement including priority information pertaining to each of the plurality of core VM's.

30. A computer program product as recited in claim 29 wherein the resources are dynamically allocated among the core VM's.

31. A computer program product as recited in claim 29 wherein the resources include memory.

32. A computer program product as recited in claim 29 wherein the resources include processing power.

33. A computer program product as recited in claim 29 wherein the resources include I/O.

34. A computer program product as recited in claim 29 wherein the core space resides on a plurality of physical devices.

35. A computer program product as recited in claim 29 wherein the core space includes a portion allocated to a core VM.

36. A computer program product as recited in claim 29 wherein the core space includes a portion reserved for a core VM.

37. A computer program product as recited in claim 29 wherein the core space includes a portion borrowed for a core VM.

38. A computer program product as recited in claim 29 wherein the core space includes portions that are specifically allocated.

39. A computer program product as recited in claim 29 wherein the core space includes portions that are generally allocated.

40. A computer program product as recited in claim 29 wherein the core space includes a portion that is unallocated.

41. A computer program product as recited in claim 29, the computer program product further comprising computer instructions for allocating a portion of the core space to a core VM based on the policy.

42. A computer program product as recited in claim 29, the computer program product further comprising computer instructions for enforcing an allocation of the core space to a core VM based on the policy.

43. A segmented virtual machine (VM) executing within one or more computer systems, the segmented virtual machine comprising:
 a core VM configured to perform VM internal execution functionality; and
 a shell VM associated with the core VM, wherein
  the shell VM is configured to perform VM interactions with an external environment and to forward certain calls from the external environment to its associated core VM;
  the core VM and the shell VM cooperate to form the segmented VM; and
  the core VM is configured to bypass the shell VM in some connections to communicate with an external application.

44. A segmented VM as recited in claim 43, wherein the external application is another core VM.

45. A segmented VM as recited in claim 43, wherein the core VM is configured to communicate with an external application by using an application programming interface (API).

46. A method of executing a segmented virtual machine (VM) comprising:
 performing VM internal execution functionality on a core VM, wherein:
  the core VM is associated with a shell VM configured to perform VM interactions with an external environment and to forward certain calls from the external environment to its associated core VM; and
  the core VM and the shell VM cooperate to form the segmented VM; and
 bypassing the shell VM in some connections to communicate with an external application.

47. A method as recited in claim 46, wherein the external application is another core VM.

48. A method as recited in claim 46, wherein the core VM is configured to communicate with an external application by using an application programming interface (API).

49. A computer program product for executing a segmented virtual machine (VM), the computer program product being embodied in a computer readable storage medium and comprising computer instructions for:
 performing VM internal execution functionality on a core VM, wherein:
  the core VM is associated with a shell VM configured to perform VM interactions with an external environment and to forward certain calls from the external environment to its associated core VM; and
  the core VM and the shell VM cooperate to form the segmented VM; and bypassing the shell VM in some connections to communicate with an external application.

50. A computer program product as recited in claim 49, wherein the external application is another core VM.

51. A computer program product as recited in claim 49, wherein the core VM is configured to communicate with an external application by using an application programming interface (API).

\* \* \* \* \*